(12) United States Patent
Wang

(10) Patent No.: US 6,532,485 B1
(45) Date of Patent: Mar. 11, 2003

(54) METHOD AND APPARATUS FOR PERFORMING MULTIPLICATION/ADDITION OPERATIONS

(75) Inventor: Yong Wang, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/391,166

(22) Filed: Sep. 8, 1999

(51) Int. Cl.$^7$ .................................................. G06F 7/38

(52) U.S. Cl. ....................................................... 708/523

(58) Field of Search .................................. 708/523, 501

(56) References Cited

U.S. PATENT DOCUMENTS

| | | | | |
|---|---|---|---|---|
| 5,751,619 A | * | 5/1998 | Agarwal et al. | 708/523 |
| 5,784,305 A | * | 7/1998 | Nadehara | 708/523 |
| 5,796,644 A | * | 8/1998 | Jiang | 708/523 |
| 6,282,557 B1 | * | 8/2001 | Dhong et al. | 708/523 |

* cited by examiner

Primary Examiner—Tan V. Mai

(57) ABSTRACT

An apparatus for multiplying a first number and a second number together is described, each of the numbers having a width of 8, 16, 32, 64 or 128-bits or more. The 32-bit embodiment of the apparatus includes a booth recorder having two inputs and 16 outputs, the recorder determining 16 individual booth groups associated with the second number and providing one partial product per booth group on individual ones of the 16 outputs. The apparatus further includes first, second, third and fourth 4:2 compressors each having four inputs individually coupled to consecutive ones of the booth recorder outputs, a carry output and a sum output, fifth and sixth 4:2 compressors each having four inputs, the first and third inputs of the fifth and sixth compressors being individually coupled to the sum outputs of the first, second, third and fourth compressors respectively, the second and fourth inputs of the fifth and sixth compressors being individually coupled to the carry outputs of the first, second, third and fourth compressors respectively. The apparatus further includes a seventh 4:2 compressor having four inputs, the first and third inputs of the seventh compressor being individually coupled to the sum outputs of the fifth and sixth compressors respectively, the second and fourth inputs of the seventh compressor being individually coupled to the carry outputs of the fifth and sixth compressors respectively and an adder having two inputs individually coupled to the carry and sum outputs of the seventh compressor, and an output.

12 Claims, 4 Drawing Sheets

| inputs | | | | | outputs | | |
|---|---|---|---|---|---|---|---|
| $x_3$ | $x_2$ | $x_1$ | $x_0$ | $c_{in}$ | $c_{out}$ | carry | sum |
| 0 | 0 | 0 | 0 | $c_{in}$ | 0 | 0 | $c_{in}$ |
| 0 | 0 | 0 | 1 | $c_{in}$ | 0 | $c_{in}$ | $c_{in}$ |
| 0 | 0 | 1 | 0 | $c_{in}$ | 0 | $c_{in}$ | $c_{in}$ |
| 0 | 0 | 1 | 1 | $c_{in}$ | 1 | 0 | $c_{in}$ |
| 0 | 1 | 0 | 0 | $c_{in}$ | 0 | $c_{in}$ | $c_{in}$ |
| 0 | 1 | 0 | 1 | $c_{in}$ | 0 | 1 | $c_{in}$ |
| 0 | 1 | 1 | 0 | $c_{in}$ | 0 | 1 | $c_{in}$ |
| 0 | 1 | 1 | 1 | $c_{in}$ | 1 | $c_{in}$ | $c_{in}$ |
| 1 | 0 | 0 | 0 | $c_{in}$ | 0 | $c_{in}$ | $c_{in}$ |
| 1 | 0 | 0 | 1 | $c_{in}$ | 0 | 1 | $c_{in}$ |
| 1 | 0 | 1 | 0 | $c_{in}$ | 0 | 1 | $c_{in}$ |
| 1 | 0 | 1 | 1 | $c_{in}$ | 1 | $c_{in}$ | $c_{in}$ |
| 1 | 1 | 0 | 0 | $c_{in}$ | 1 | 0 | $c_{in}$ |
| 1 | 1 | 0 | 1 | $c_{in}$ | 1 | $c_{in}$ | $c_{in}$ |
| 1 | 1 | 1 | 0 | $c_{in}$ | 1 | $c_{in}$ | $c_{in}$ |
| 1 | 1 | 1 | 1 | $c_{in}$ | 1 | 1 | $c_{in}$ |

Fig. 3

METHOD AND APPARATUS FOR PERFORMING MULTIPLICATION/ADDITION OPERATIONS

BACKGROUND OF THE INVENTION

1. Field of the Invention

The present invention relates to combination multiplication and addition operations in a computing environment. More particularly, the present invention relates to an apparatus for performing nonparallel and parallel multiplication/addition operations, and a method for operating that apparatus.

2. The Background Art

In modern computers, there exists a mathematical function N=A*B+C which is performed frequently. Although the entire function is important, the prior art performs the multiplication first, and then adds "C" to the result.

Two types of methods are used commonly in computers to perform the multiplication/addition calculation, parallel and traditional.

Traditional multiplication divides the two numbers into upper and lower halves. The upper and lower halves are then multiplied together in succession, and the results of those multiplications are then added together, forming the final result of the multiplication.

Therefore, two 32-bit numbers "A" and "B" being multiplied together will each be broken into halves, making "Ah" and "Al" represent the upper and lower halves of the number "A", and "Bh" and "Bl" represent the upper and lower halves of the number "B". The functions Ah*Bh+Ch=Nh, and Al*Bl+Cl=Nl are then performed, and the two results Nh and Nl are then put back together as [Nh][Nl] to form the final result N. This method of combining three numbers requires 2 identical apparatus's, each operating in parallel on different halves of the calculation.

Parallel multiplication, the second method, takes the same numbers "A", "B" and "C" and also breaks each of them into upper and lower halves. The lower half of each is sign extended to the size of the original number. The lower halves are then multiplied together on one apparatus having the capability to operate on numbers having that width, and the upper halves are combined using an apparatus having the capability to operate on the smaller width. For example, when 32-bit binary numbers are being combined, the upper and lower halves are each 16-bits. The lower halves are sign extended to 32 bits, and multiplied and added together using 32-bit hardware at the same time that the upper halves are being combined using 16-bit hardware. The upper and lower halves are then recombined in an adder.

While suitable for their intended purposes, the traditional and parallel combinatory apparatus's are different, and therefore require more space to implement than would otherwise be required, if traditional and parallel operations were able to be performed using the same apparatus.

It would therefore be beneficial to provide an apparatus which can be used to perform both traditional and parallel mathematical operations.

SUMMARY OF THE INVENTION

An apparatus for multiplying a first number and a second number together is described, each of the numbers having a width of 8, 16, 32, 64 or 128-bits or more. The 32-bit embodiment of the apparatus comprises a booth recoder having two inputs and 16 outputs, the recoder determining 16 individual booth groups associated with the second number and providing one partial product per booth group on individual ones of the 16 outputs. The apparatus further comprises first, second, third and fourth 4:2 compressors each having four inputs individually coupled to consecutive ones of the booth recoder outputs, a carry output and a sum output, fifth and sixth 4:2 compressors each having four inputs, the first and third inputs of the fifth and sixth compressors being individually coupled to the sum outputs of the first, second, third and fourth compressors respectively, the second and fourth inputs of the fifth and sixth compressors being individually coupled to the carry outputs of the first, second, third and fourth compressors respectively. The apparatus further includes a seventh 4:2 compressor having four inputs, the first and third inputs of the seventh compressor being individually coupled to the sum outputs of the fifth and sixth compressors respectively, the second and fourth inputs of the seventh compressor being individually coupled to the carry outputs of the fifth and sixth compressors respectively and an adder having two inputs individually coupled to the carry and sum outputs of the seventh compressor, and an output.

BRIEF DESCRIPTION OF THE DRAWINGS

FIG. 3 is a table showing the outputs of bitwise compressors according to one embodiment of the present invention.

DETAILED DESCRIPTION OF ONE EMBODIMENT

Those of ordinary skill in the art will realize that the following description of the present invention is illustrative only and not in any way limiting. Other embodiments of the invention will readily suggest themselves to such skilled persons who are familiar with this disclosure.

The present invention provides an apparatus which can be used to perform both traditional and parallel mathematical operations, thus saving significant space over prior art assemblies which perform the two types of operations using different apparatus's.

In order to perform the multiplication function in the shortest amount of time, in prior art and present invention assemblies, and using hardware occupying the least amount of space, booth recoding is used. Booth recoding is a method by groups of bits chosen from binary number "B" are used as a key to determine the number of times the binary number "A" is added to itself, in order to accomplish the multiplication.

Figure 1:
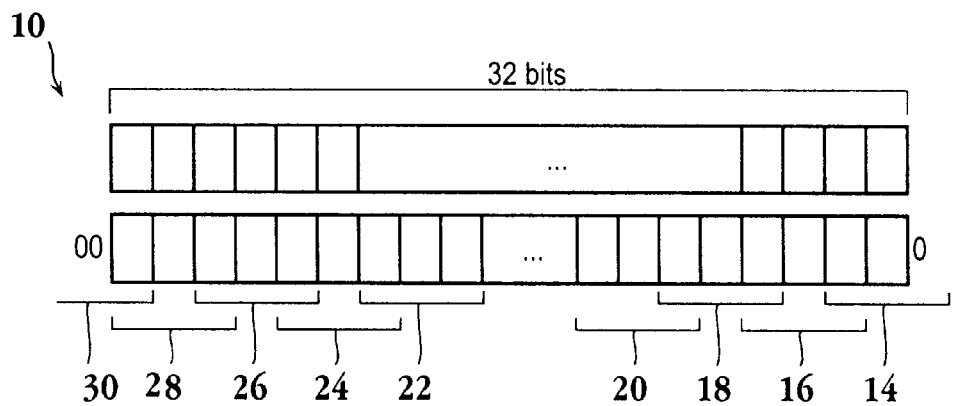
FIG. 1 is an example of two binary numbers used to perform radix-4 booth recoding.

FIG. 1 is an example of two binary numbers used to perform radix-4 booth recoding.

Referring to FIG. 1, 16-bit binary numbers 10 and 12 are provided, representing numbers "A" and "B" respectively.

In prior art booth recoding, a bit containing a "0" is added to the least significant bit (LSB) position of the number. As those of ordinary skill in the art having the benefit of this disclosure are readily aware, this operation is the equivalent of multiplying the number by two.

In the present invention, the equivalent of table lookup is used to determine "partial products", and therefore it is not necessary to add a zero to the LSB position of the number being used as a key. However, for convenience, binary number 12 of FIG. 1 is shown having a zero in its LSB position. Number 12 is further seen having 16 informational bits, and two leftmost bits having zeros. These bits are used in booth recoding.

To perform booth recoding, overlapping three-bit groups such as groups 14, 16, 18, 20, 22, 24, 26, 28 and 30 are chosen from number 12, each three bit group being a key into a partial product table. The group of partial products associated with the group of keys is then provided in parallel to a group of compressor. In the prior art and in the present invention, 4:2 compressors are used. However, while the prior art utilizes full adders for compression, the present invention uses a series of table lookup compressors.

Table 1 below shows the selection of each partial product according to the particular three-bit booth group.

TABLE 1

| Booth group | Partial product |
| --- | --- |
| 000 | 0 |
| 001 | A |
| 010 | A |
| 011 | 2A |
| 100 | −2A |
| 101 | −A |
| 110 | −A |
| 111 | 0 |

Using Table 1 above, if a given booth group was "011", the partial product chosen as the associated input to the respective compressor would be the binary number which is twice the value of number "A".

Figure 2:
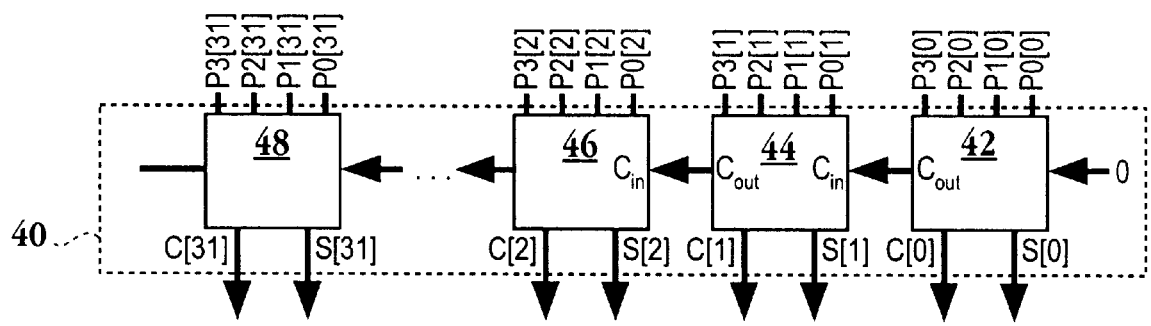
FIG. 2 is a block diagram of a present invention 4:2 compressor.

FIG. 2 is a block diagram of a present invention 4:2 compressor.

Referring to FIG. 2, 16-bit compressor 20 includes 16 individual bitwise compressors such as compressors 22, 24, 26, and 28, each bitwise compressor having four inputs and two outputs. Each input represents a different bit of a different one of the partial products being combined. Each bit of each partial product is combined with bits in similar positions for other adjacent partial products.

For example, booth groups 14, 16, 18, and 20 are adjacent, and are in order from right to left. Those booth groups are associated with particular partial products, according to Table 1 above. Each partial product is 16-bits wide. Therefore, bit 0 of each of partial products 14, 16, 18, and 20 are provided as inputs to bitwise compressor 22, bit 1 of each of partial products 14, 16, 18, and 20 are provided as inputs to bitwise compressor 24, and so on. Each bitwise compressor then provides an output according to FIG. 3. Each carry out of a given stage is provided as the carry-in bit of the stage to its left, as seen in FIG. 2. For the rightmost stage of FIG. 3, a zero is provided as the carry-in value.

Referring to FIG. 3, if bit 0 for the partial products associated with booth groups 14, 16, and 18 and 20 is "0", "1", "1", "0" respectively, the carry-out value (represented as $C_{out}$ in FIG. 3) is 0, and the carry bit is "1". The sum bit always follows the carry-in input (represented as $C_{in}$ in FIG. 3). Therefore, there are 16 bits×4=64 input bits, and 16 bits×2=32 output bits for each bitwise compressor 22.

Figure 4:
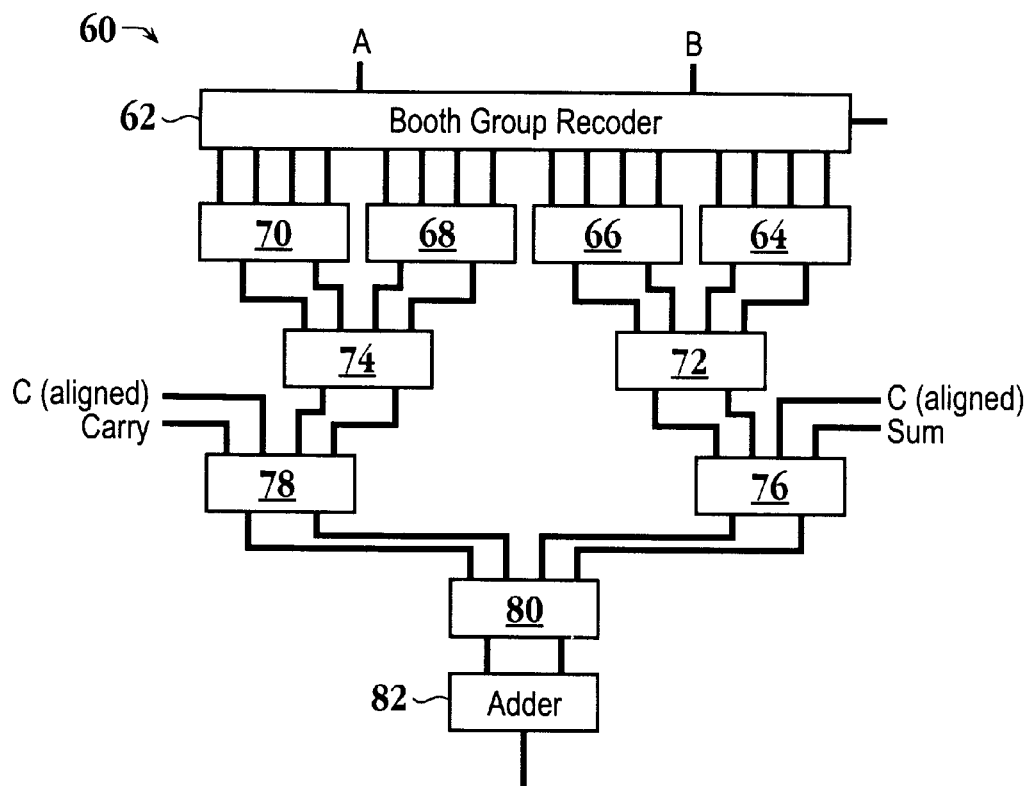
FIG. 4 is a block diagram showing a present invention apparatus for performing the function N=A*B+C.

FIG. 4 is a block diagram showing a present invention apparatus for performing the function N=A*B+C.

Referring to FIG. 4, system 60 includes booth recoder 62, 4:2 compressors 64, 66, 68, 70, 72, 74, 76, 78, and 80, and adder 82. For traditional operations, booth recoder 62 selects booth groups such as booth groups 14, 16, 18, etc. previously described in relation to FIG. 1, and then provides the corresponding partial products according to table 1 above to the inputs of 4:2 compressors 64, 66, 68, and 70. The outputs of 4:2 compressors 64, 66, 68, and 70 are then provided as inputs to 4:2 compressors 72 and 74.

The outputs of 4:2 compressors 72 and 74 are provided to 4:2 compressors 76 and 78 respectively. Two other inputs to 4:2 compressor 76 are the 32 bits of number C(properly aligned), from the equation N=A*B+C., and an input tied to a binary zero. Two other inputs to 4:2 compressor 78 are the 32 bits of number C(properly aligned), from the equation N=A*B+C., and and an input tied to a binary zero. The inputs that are tied to binary zero may alternatively be removed, and the circuits for the respective 4:2 compressors designed to imply a zero.

To have number C properly aligned means that C is provided to 4:2 compressors in the same manner as are other inputs. Thus, bit 0 of number C is provided to the rightmost bitwise compressor (such as bitwise compressor 42 of FIG. 2) within 4:2 compressors 76 and 78, and bit 1 provided to the next left-oriented bitwise compressor (such as bitwise compressor 44 of FIG. 2) and so on.

The outputs of 4:2 compressors 76 and 78 are then provided to 4:2 compressor 80. The output of 4:2 compressor 80 is then provided to carry-sum adder 82 for the final addition. The output of adder 82 is the 32 bit desired number N, the result of performing the operation N=A*B+C.

The apparatus of FIG. 4 is significantly faster and requires substantially less space to implement than the prior art apparatus's. Further, using the present invention apparatus in a manner slightly differently than just described allows the performance of the same computation N=A*B+C using a technique known as "traditional". Thus, the apparatus of FIG. 4 may be used for both traditional and parallel computations, a feat not able to be accomplished with prior art apparatus's.

When performing traditional multiplication/adds as described above, the first booth group has a least significant bit of zero, and each succeeding booth group is chosen in overlapping three bit groups, using all bits in the original number B.

When performing parallel multiplication/adds, the first number is separated into two halves, an upper half and a lower half. The upper half has the high bits which were present in the original first number, combined with a number of least significant bits (LSB) having zeros, the number of LSB's bringing the new upper half to be the same width as the original number.

The lower half is sign extended to be the same width as the original number. Thus, if the original number A is 32 bits wide, the lower half is sign extended from 16 bits to 32 bits.

Figure 5:
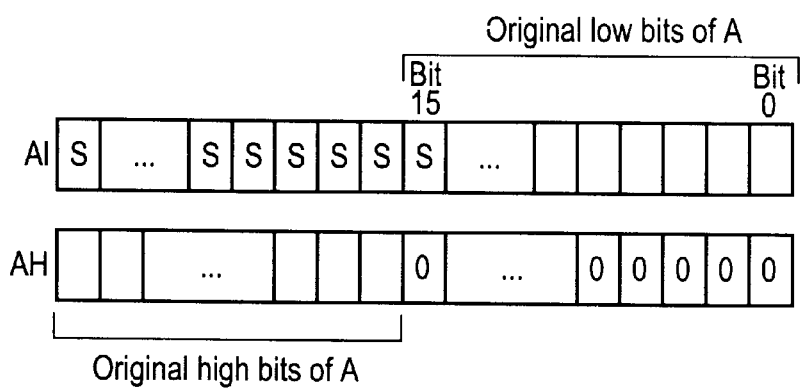
FIG. 5 shows one example of a new numbers formed from the original upper and lower halves of original number A.
Figure 6:
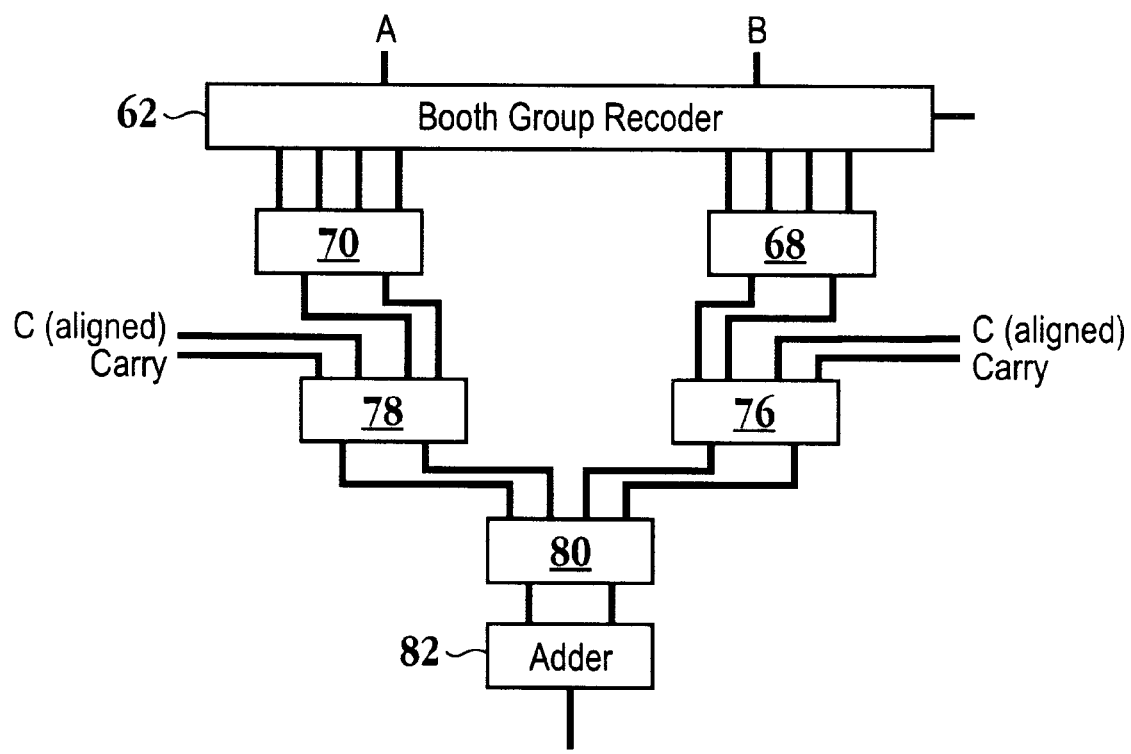
FIG. 6 is a block diagram of an alternative embodiment of FIG. 4.

FIG. 5 shows one example of a new numbers formed from the original upper and lower halves of original number A.

The new upper and lower halves are then processed using the FIG. 4 apparatus as previously described, using the upper and lower halves of the second number B to determine the booth groups for the new upper and lower halves of A. When determining the booth groups corresponding to the new upper half of A, a zero is added to the least significant bit position of the upper half of B, and two zeros are added to the most significant bit position of the upper half of B in the case of unsigned multiplication, or is alternatively sign extended two bits in the case of signed multiplication/add operations, as described previously.

Those of ordinary skill in the art having the benefit of this disclosure will readily recognize that the present invention may easily be adapted to systems having 8, 32, 64, 128 bits per number or more, by constructing 4:2 compressors with a number of bitwise compressors equal to the number of bits in each number A, B, and C, and by using suitable numbers of those 4:2 compressors in a tree form as shown in FIG. 4, also depending on the number of bits involved in the original numbers A, B, and C.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus for multiplying a first number and a second number together, each of first and second numbers having a width of 32-bits, the apparatus comprising:

a booth recoder having two inputs and 16 outputs, said recoder determining 16 individual booth groups associated with said second number and providing one partial product per booth group on individual ones of said 16 outputs;

first, second, third and fourth 4:2 compressors each having four inputs individually coupled to consecutive ones of said booth recoder outputs, a carry output and a sum output, fifth and sixth 4:2 compressors each having four inputs, said first and third inputs of said fifth and sixth compressors being individually coupled to said sum outputs of said first, second third and fourth compressors respectively, said second and fourth inputs of said fifth and sixth compressors being individually coupled to said carry outputs of said first, second, third and fourth compressors respectively, a carry output and a sum output;

seventh and eighth 4:2 compressors each having four inputs, said first, second, third and fourth inputs of said seventh compressor being individually coupled to a carry input, a source of a third binary number, said fifth compressor carry output, and said fifth compressor sum output, said first, second, third and fourth inputs of said eighth compressor being individually coupled to said sixth compressor carry output, said sixth compressor sum output, said source of the third number, and a sum input;

a ninth 4:2 compressor having four inputs, said first and third inputs of said ninth compressor being individually coupled to said sum outputs of said seventh and eighth compressors respectively, said second and fourth inputs of said ninth compressor being individually coupled to said carry outputs of said seventh and eighth compressors respectively; and an adder having two inputs individually coupled to said carry and sum outputs of said ninth compressor, and an output.

2. The apparatus of claim 1, wherein the partial product associated with each of the booth groups is stored in a lookup table.

3. The apparatus of claim 1, wherein the 16 individual booth groups are overlapping three bit groups.

4. The apparatus of claim 1, wherein a first booth group has a least significant bit of zero.

5. The apparatus of claim 1, wherein the apparatus is configured to be used for both non-parallel and parallel computations.

6. The apparatus of claim 1, wherein the carry input and the sum input for the seventh and eighth 4:2 compressors, respectively, are removed.

7. The apparatus of claim 6, wherein the circuits corresponding to the carry input and the sum input for the seventh and eighth 4:2 compressors, respectively, are designed to imply a zero.

8. An apparatus for multiplying a first number and a second number together, each of first and second numbers having a width of 16-bits, the apparatus comprising:

a booth recoder having two inputs and 16 outputs, said recoder determining 16 individual booth groups associated with said second number and providing one partial product per booth group on individual ones of said 16 outputs;

first and second 4:2 compressors each having four inputs individually coupled to consecutive ones of said booth recoder outputs, a carry output and a sum output, third and fourth 4:2 compressors each having four inputs, said first, second, third and fourth inputs of said third compressor being individually coupled to a carry input, a source of a third binary number, said first compressor carry output, and said first compressor sum output, said first, second, third and fourth inputs of said fourth compressor being individually coupled to said second compressor carry output, said second compressor sum output, said source of the third number, and a sum input;

a fifth 4:2 compressor having four inputs, said first and third inputs of said fifth compressor being individually coupled to said sum outputs of said third and fourth compressors respectively, said second and fourth inputs of said fifth compressor being individually coupled to said carry outputs of said third and fourth compressors respectively; and an adder having inputs individually coupled to said carry and sum outputs of said fifth compressor, and an output.

9. The apparatus of claim 8, wherein the partial product associated with each of the booth groups is stored in a lookup table.

10. The apparatus of claim 8, wherein the 16 individual booth groups are overlapping three bit groups.

11. The apparatus of claim 8, wherein a first booth group has a least significant bit of zero.

12. The apparatus of claim 8, wherein the apparatus is configured to be used for both non-parallel and parallel computations.

* * * * *